(No Model.) 2 Sheets—Sheet 1.
C. A. McDONALD & C. W. TOWNSEND.
DAMPER REGULATOR.
No. 334,601. Patented Jan. 19, 1886.
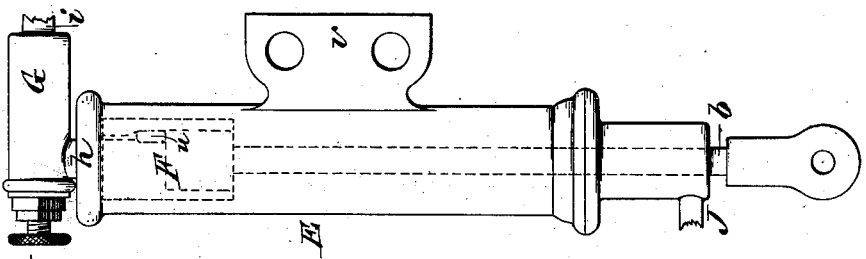
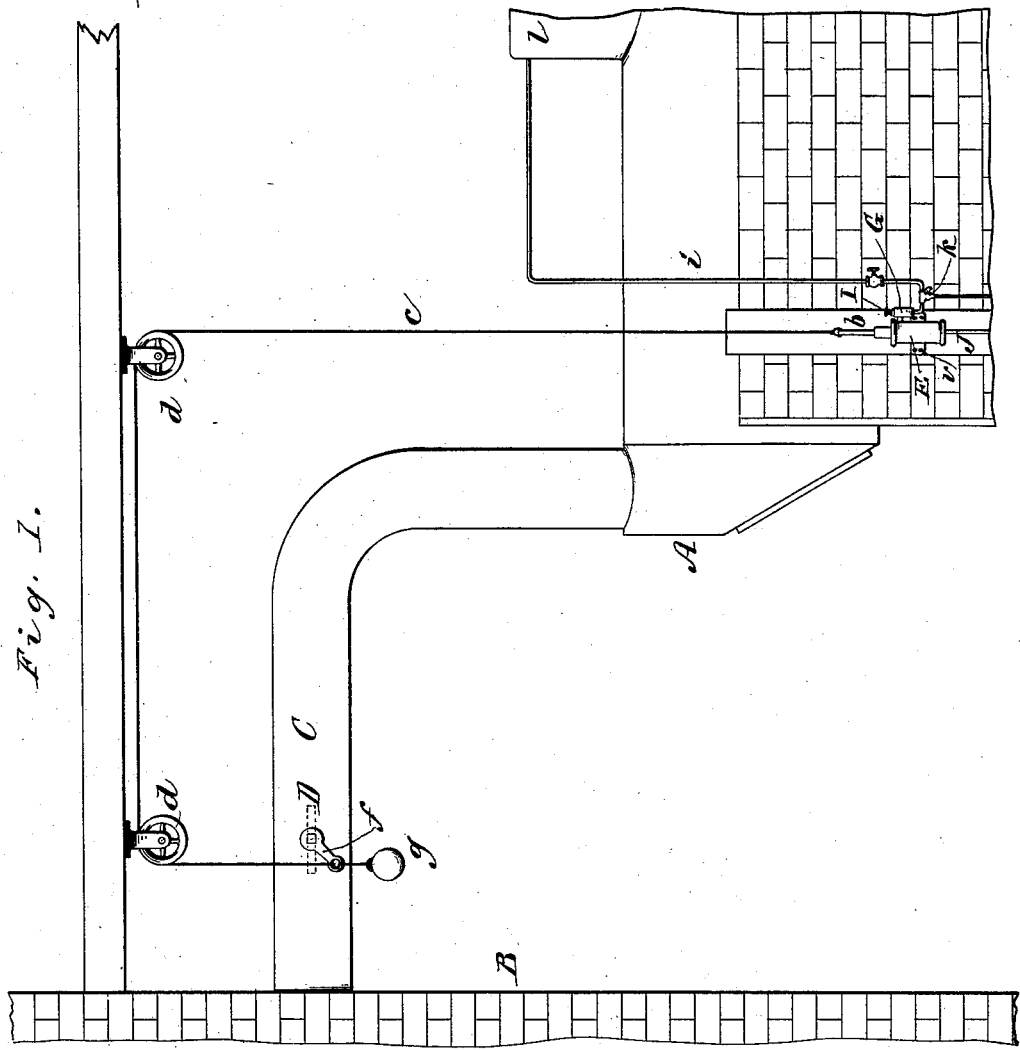
WITNESSES:
INVENTOR:
C. A. McDonald
C. W. Townsend
BY Munn & Co
ATTORNEYS.

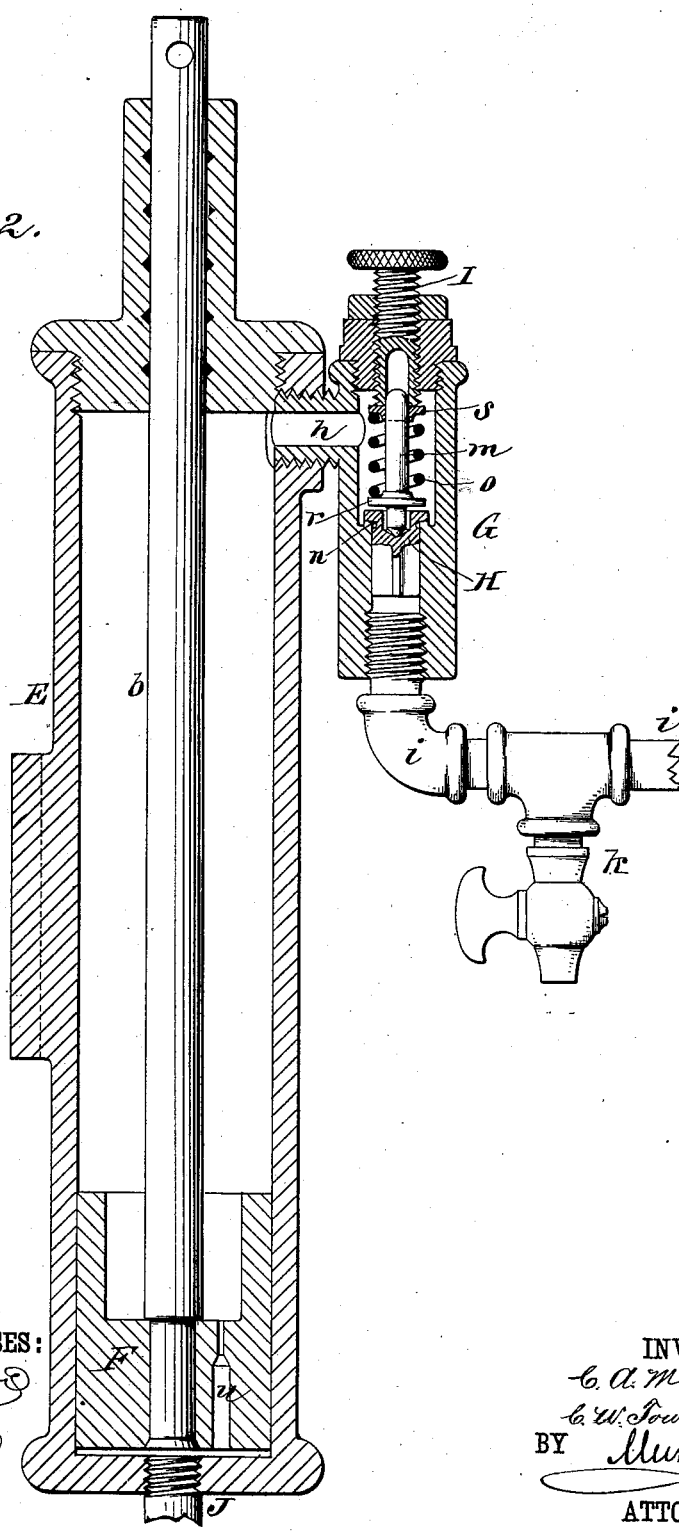

UNITED STATES PATENT OFFICE.

CHARLES A. McDONALD AND CHARLES W. TOWNSEND, OF PORTLAND, OREGON; SAID McDONALD ASSIGNOR OF ONE-HALF OF HIS RIGHT TO SAID TOWNSEND.

DAMPER-REGULATOR.

SPECIFICATION forming part of Letters Patent No. 334,601, dated January 19, 1886.

Application filed October 2, 1885. Serial No. 178,806. (No model.)

*To all whom it may concern:*

Be it known that we, CHARLES A. McDONALD and CHARLES W. TOWNSEND, both of Portland, in the county of Multnomah and State of Oregon, have invented certain new and useful Improvements in Damper-Regulators for Steam-Boilers and for other Purposes, of which the following is a full, clear, and exact description.

This invention is applicable to a variety of purposes in which a damper or valve is used to control the pressure of vapors, gases, or fluids, including the pressure of steam in the boilers of stationary and locomotive engines, the working-pressure of reducing-valves in steam, water, and other pipes, and for controlling the throttle-valves of pumps, air-compressors, &c., the invention being equally applicable to apparatus using steam, air, gas, or water under pressure, and when applied to steam-boilers it may be used to control the damper, whether arranged in the smoke stack or flue leading thereto or in the ash pit or pan of the boiler. As in another invention of ours for which a circular of allowance of Letters Patent of the United States bearing date July 27, 1885, was issued to us, the invention which is the subject of this specification comprises means whereby a positive action or direct pressure of the working vapor, gas, or fluid is used to close the damper or valve controlling the pressure as against a spring or weight for opening the valve; also, means for providing for the escape of the vapor, gas, or fluid after it has performed its duty on the damper or valve which controls the pressure, and for draining the connections of fluid or condensed vapor; likewise, means for communicating motion to the damper or like valve. These means included a combination, with the damper or valve to be controlled, and with the regulator-cylinder, its piston, and mechanism connecting said piston with its damper or valve, of a valve-case, an adjustable loaded pressure-valve therein, pipes or connections for supplying steam or other vapor, gas, or fluid under pressure to the face side of the pressure-valve, and, after passage through such valve, to the piston of the regulator, exhaust and drain pipe devices, and connections from the regulator, and a weight applied to return the piston of the regulator to its normal position after it has been relieved of pressure, the whole being organized to close the damper or valve to be controlled by the pressure of the vapor, gas, or fluid brought to bear upon the piston of the regulator.

The invention which is the subject of this specification, and which it will suffice to describe as applied to control the damper or dampers of steam-boilers, consists in a novel construction of the adjustable loaded pressure-valve of the regulator, of the exhausting means connected with the regulator, and of the means for connecting the piston of the regulator with the damper or valve of a stationary-engine boiler to be controlled, and for returning said piston to its normal position after it has been relieved of pressure, substantially as hereinafter described and claimed.

Reference is to be had to the accompanying drawings, forming part of this specification, in which similar letters of reference indicate corresponding parts in all the figures.

Figure 1 represents a view in elevation of a damper-regulator embodying our invention as adapted and applied to a stationary steam-boiler. Fig. 2 is a longitudinal section, upon a larger scale, of the regulator-cylinder with its attached pressure-valve; and Fig. 3, an elevation of the regulator-cylinder with the pressure-valve differently arranged, and with provision for making the connection with the damper or dampers to be controlled from below instead of from above the piston of the regulator-cylinder.

Referring in the first instance to Figs. 1 and 2 of the drawings, A indicates a stationary furnace and boiler; B, the chimney, and C the draft-flue from the furnace to the chimney, fitted with a damper, D.

E is the cylinder of the automatic damper-regulator, F its piston, and G the pressure-valve case, here shown as screwed into the side of the cylinder E and parallel with it, but which may be connected with the head of the cylinder in transverse relation with the latter. The rod $b$ of the cylinder E, which is here shown to occupy an upright position, is connected at its upper end, which in this illustration projects through a gland in the upper end of said cylinder, by means of a wire chain or cord, $c$, passing over or round pulleys $d$, with the damper-lever $f$, that has attached to it a weight, $g$, which operates to open the damper and to return the piston F to its normal position after the pressure on it used to close the damper has been removed. Levers might be substituted for the wire or cord $c$ and pulleys $d$; but the wire or cord and pulley arrangement is a convenient one for stationary-boiler furnaces.

The pressure-valve case G is connected at or near its upper or one end by a connection, $h$, with the upper or one end of the cylinder E, and at its lower or opposite end by a pipe, $i$, having a drain-cock, $k$, for water of condensation in said pipe, with a steam-dome, $l$, for supplying the regulator with dry steam. The pressure-valve H, arranged within the case G, is a disk or puppet, one having steady wings, and has its face exposed to steam passing through the pipe $i$. The back of said valve has a recess, in which is fitted a pointed or centering spindle, $m$. This provides for holding the valve squarely on its seat $n$ when said valve is closed by a spring, $o$, arranged around the centering-spindle $m$, between a stop or disk, $r$, on the spindle, and a follower, $s$, loose thereon.

I is the adjusting-screw of the valve H, arranged to pass through a cap on the valve-case G and to bear down or against the follower $s$. This adjusting-screw is made hollow to receive and to permit of sliding and being guided by and within it the upper or back end of the centering-spindle $m$. This construction secures a very easy and perfect action of the pressure-valve H.

The piston F of the cylinder E has a small drain or relief hole, $u$, through it, to permit of water of condensation draining off and to allow steam to escape by a pipe, J, when the valve seats. This drain and escape hole $u$, being inside of the piston F, in no way interferes with the packing of said piston, if any.

In the operation of the regulator, supposing the valve H to be set by the screw I and spring $o$ to open at one hundred and twenty pounds pressure in the boiler, said valve in lifting allows steam to escape through the connection $h$ to the cylinder E and to force the piston F down and so to close the damper D against the counteracting effect of the weight $g$. When the steam-pressure in the boiler falls one pound (more or less) below the above pressure, the valve H seats and the spent steam escapes through the aperture $u$ in the piston F, and the counter-weight $g$ forces the piston back to its starting position in the cylinder E and opens the damper D. By properly adjusting the screw I, of course, the damper can be closed at different pressures of the steam.

In Fig. 3 there is the same combination of parts, but differently arranged. Thus the pressure-valve case G is in transverse axial relation with the cylinder E and connects with the head instead of the side of the cylinder, and the piston-rod $b$ passes through a lower chamber, with which the drain-pipe J connects, to make the connection from below by means of a weighted lever or levers with the damper or dampers to be controlled. This arrangement will be found more convenient for locomotive-engine-boiler furnaces to control the damper or dampers in the smoke-stack or ash-pan, as the case may be, the cylinder E having a foot or bracket, $v$, for securing it in position, as shown also in Fig. 1.

Having thus described our invention, we claim as new and desire to secure by Letters Patent—

1. In damper and other valve regulators for steam-boilers and other purposes, the combination, with the valve-case G, the regulator-cylinder E, its piston F, and connection $h$, of the pressure-valve H, the centering-spindle $m$, the spring $o$, the follower $s$, and the hollow adjusting-screw I, substantially as shown and described.

2. The piston F of the regulator-cylinder, provided with an escape-aperture, $u$, through it, in combination with a drain-pipe connected with said cylinder on the reverse side or end to the inlet-opening through which the controlling gas or vapor is admitted to operate the piston, essentially as described.

CHARLES A. McDONALD.
CHARLES W. TOWNSEND.

Witnesses to the signature of Charles A. McDonald:
 J. R. STODDARD,
 HENRY WAGNER.

Witnesses to the signature of Charles W. Townsend:
 W. S. DOWNER,
 C. H. HOLLEY.